E. J. RICHARDSON.
HOSE CLAMP.
APPLICATION FILED APR. 3, 1916.

1,275,091.

Patented Aug. 6, 1918.

WITNESSES
Chas. E. Kumpus
Wm Leaman

INVENTOR
Edgar J. Richardson
BY Richard Owen
ATTORNEY

UNITED STATES PATENT OFFICE.

EDGAR J. RICHARDSON, OF SIOUX CITY, IOWA.

HOSE-CLAMP.

1,275,091.　　　　Specification of Letters Patent.　　Patented Aug. 6, 1918.

Application filed April 3, 1916. Serial No. 88,652.

*To all whom it may concern:*

Be it known that I, EDGAR J. RICHARDSON, a citizen of the United States, residing at Sioux City, in the county of Woodbury and State of Iowa, have invented certain new and useful Improvements in Hose-Clamps, of which the following is a specification.

This invention has relation to hose clamps and the nature and objects will be readily apparent to those skilled in the art in the light of the following explanation of the accompanying drawings, illustrating what I now believe to be the preferred embodiment or mechanical expression of my invention from among other forms and arrangements within the spirit thereof and the scope of the appended claim.

However, an object of the invention is to provide a hose clamp, the binding element of which is formed of wire in place of the band heretofore employed.

Another object of the invention is to provide a hose clamp wherein the tightening element is easily operated and without the necessity of using a screw driver or other tool.

In addition to the foregoing my invention comprehends improvements in the details of construction and arrangement of parts to be hereinafter described and particularly pointed out in the appended claim.

Figure 1:
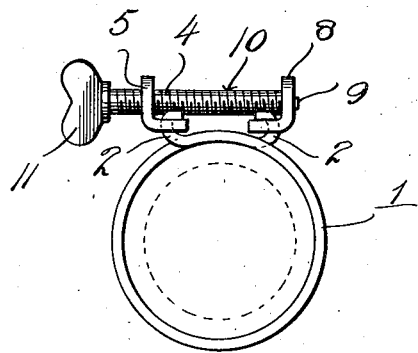
Figure 2:
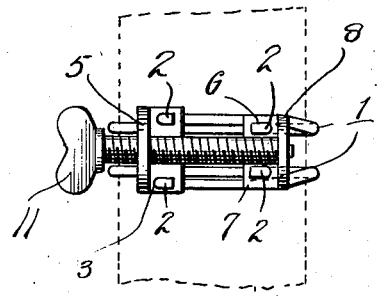
Figure 3:
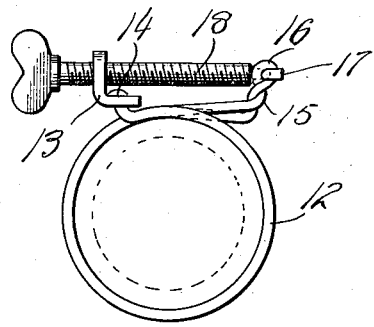

In the accompanying drawings in which similar and corresponding parts are designated by the same characters of reference throughout the several views in which they appear, Figure 1 is a view in side elevation of a hose clamp constructed after the manner of my invention, Fig. 2 is a view thereof in top plan, and, Fig. 3 is a view in side elevation of a slightly modified form.

My invention is employable generally, as a hose clamp for securing hose to pipe sections, or for securing hose sections together in abutting relation, but is specifically designed to repair leaks in hose sections somewhat after the manner of the conventional type of hose clamp. Hose clamps heretofore devised consisted of a relatively broad metallic band which was adapted to embrace the hose at the point of rupture, and by drawing the ends of the band together to contract that particular area of pipe inclosed so as to close the rupture and prevent leakage of fluid flowing through the hose.

I have discovered the fact that a wire when constricted around the hose adjacent the point of rupture will effect the closure of the rupture in a more efficacious manner than heretofore possible with the band type of clamp.

With reference to the drawings my invention comprises in its essentials circular bands of wire 1 having their ends bent to form hook portions 2. Adjacent hook terminals are adapted to engage apertures 3 formed in one arm 4 of an angle member, the other arm 5 of which is provided with a threaded aperture.

The remaining adjacent hook terminals are engaged in recesses 6 formed in the arm 7 of a second angle member the arm 8 of which is formed with a smooth aperture adapted to receive the reduced end of a threaded member 10 which is seated within the opening 5 of the first mentioned angle member. A flat broad head 11 is formed on the threaded member 10 whereby the same may be easily rotated to expand or contract the members 1.

In operation, the clamp is disposed upon the pipe in such a manner that the ruptured portion thereof lies between the bands 1, then upon rotating the head 11 so as to tighten the bands about the pipe the rupture therein, will in most cases be closed. If the rupture is not entirely closed after this application the hose clamp may be slightly disengaged and moved along the pipe in one direction or the other and reclamped; a point will eventually be found where the material of the hose will be clamped around the rupture and when this point is located the rupture will be more tightly closed than would be possible by employing a hose clamp of the band type.

In Fig. 3 of the drawings I have illustrated a slightly modified form in which one of the angle members of the combination is omitted. In this form I provide a binding element formed of a single strand of wire 12 having its terminals seated in recesses in one arm of an angle member 13 and formed with heads 14 to preclude disengagement of the band from said member. The intermediate portion of the strand after encircling the hose is formed with a twisted portion 15 and an eye 16, in which eye is seated the reduced end 17 of a threaded element 18 which is seated in a threaded aperture formed in the angle member 13.

The operation of this form of invention is quite similar to the first the only difference therein being that the point of application of power of the threaded element is upon the intermediate portion of the strand which results in converging strands of wire extending from the angle member around the hose and to the eye 16; whereas, in the first described form the bands are separate and lie in substantially parallel planes. Various ways of constructing my invention will occur to those skilled in the art, and I therefore reserve the right and privilege of changing the form of the details and otherwise altering the arrangement of the parts without departing from the spirit of the invention or the scope of the appended claim.

Having thus described my invention what I claim as new and desire to secure by Letters Patent is:

A hose clamp comprising a pair of wire strands, each having its ends in overlapping relation and its terminals curved upon themselves, a pair of angle plates, one side of each having a pair of apertures to receive one of the curved ends of each strand, the other side of one plate having a threaded aperture and the other side of the other plate having a reduced smooth opening, said plates having their sides provided with the first mentioned apertures directed toward each other, a screw engaged in the threaded aperture of the one plate, and having a reduced terminal entering the reduced opening of the other plate.

In testimony whereof I affix my signature in presence of two witnesses.

EDGAR J. RICHARDSON.

Witnesses:
D. B. STEVENS,
L. A. HUTCHISON.